US012356129B2

(12) United States Patent
Klinge et al.

(10) Patent No.: US 12,356,129 B2
(45) Date of Patent: Jul. 8, 2025

(54) MOUNT FOR ELONGATED OBJECTS (71) Applicant: VIDENDUM MEDIA SOLUTIONS S.P.A., Cassola (IT)

(72) Inventors: Timo Klinge, Hamburg (DE); Federic Sonnenberg, Berlin (DE)

(73) Assignee: VIDENDUM MEDIA SOLUTIONS S.P.A, Cassola (IT)

( * ) Notice: Subject to any disclaimer, the term of this patent is extended or adjusted under 35 U.S.C. 154(b) by 289 days.

(21) Appl. No.: 18/015,267

(22) PCT Filed: Jul. 8, 2021

(86) PCT No.: PCT/IB2021/056133
§ 371 (c)(1),
(2) Date: Jan. 9, 2023

(87) PCT Pub. No.: WO2022/009139
PCT Pub. Date: Jan. 13, 2022

(65) Prior Publication Data
US 2023/0262373 A1    Aug. 17, 2023

(30) Foreign Application Priority Data

Jul. 10, 2020 (IT) .................. 102020000016822

(51) Int. Cl.
*H04R 1/08* (2006.01)
*F16M 11/04* (2006.01)
(52) U.S. Cl.
CPC ............. *H04R 1/08* (2013.01); *F16M 11/041* (2013.01)

(58) Field of Classification Search
CPC ................................ H04R 1/08; F16M 11/041
See application file for complete search history.

(56) References Cited

U.S. PATENT DOCUMENTS

D854,521 S        7/2019  Sunwoo et al.
2016/0353189 A1*  12/2016 Klemme ................ H04R 1/086

FOREIGN PATENT DOCUMENTS

JP    2007068687 A  *  3/2007
JP    2011240112 A      12/2011
WO   2007085805 A1      8/2007

* cited by examiner

*Primary Examiner* — Sunita Joshi
(74) *Attorney, Agent, or Firm* — Volpe Koenig (57) ABSTRACT

A mount device (1) for supporting objects (100) comprises a support device (10) and at least an holding element (20) coupled to the support device (10) and configured for holding said object (100), the support device (10) comprising at least a support element (4, 5), an adjusting element (3) and an actuating device (50) coupled to adjusting element (3) and arranged for being actuated for moving the adjusting element (3) along a translation direction (F) in relation to the support element (2) and to the actuating device, the adjusting element (3) and the support element (4, 5) being provided with pushing element arranged for moving the adjusting device and/or the support element along a clamp direction (F1) closer or farther one from another so that by translating the adjusting element along the translation direction (F) the width of the support device along the clamp direction (F1) is adjusted.

10 Claims, 4 Drawing Sheets

MOUNT FOR ELONGATED OBJECTS

TECHNICAL FIELD

The invention relates to a mount for supporting object and in particular a mount for supporting elongated objects.

The mount of the invention is particularly aimed for supporting microphones or similar devices.

TECHNOLOGICAL BACKGROUND

It is known to support elongated objects, for example microphones, by means of supporting devices provided with a frame to which holding means for holding microphones are provided.

The holding means are so shaped to define housing in which the microphone is inserted.

In order to hold the microphone in a more stable way, known supporting devices are usually provided with at least two different holding means fixed to the supporting device and spaced apart from one another along a longitudinal direction of the supporting device and arranged for holding the microphone in different longitudinal positions. In this way, it is avoided that the microphones or, in general elongated objects, are not stable in the holding means and thus tilt in the holding means.

The microphones may have different longitudinal dimensions. For supporting microphones having different longitudinal dimensions with the same supporting device, it is necessary to provide a certain number of holding means spaced one from another along the longitudinal axis of the supporting device. The distance between two adjacent holding means must be adjusted depending on the shape and length of the microphone.

The holding means are provided with locking means for locking/unlocking the holding means to/from the supporting device, the locking means being so configured to allow the holding means to be firmly fixed to the supporting device.

Each holding means is provided with locking means that must be actuated by a user for locking/unlocking the corresponding holding means on the supporting device at the desired distance one from each other.

Therefore, it is required a lot of time for preparing known supporting devices for holding a desired object thereon.

For elongated objects it is important to hold the object almost symmetrically avoiding any possible undesired tilting of the elongated object in the holding means.

Additionally, with delicate objects to be supported such as, for example, the microphones, it is important to avoid abrupt and undesired movement of the holding means and then undesired fall of the microphone from the holding means.

It is thus required to smoothly lock/unlock the holding means to the support device.

This effect it is not always achieved with known supporting devices.

SUMMARY

An object of the invention is therefore to provide a mount device so configured to overcome one or more of the drawbacks explained with reference to the known art.

An object of the invention is to provide a mount device allowing the assembling operations for mounting an object thereon to be simplified.

It is a further object of the invention to provide a mount device allowing an easier positioning of the holding means.

Another object of the invention is to provide a mount device allowing the position of the holding means to be easily adjusted.

A further object of the invention is to provide a mount device for elongated objects allowing a stable positioning of the object thereon.

A further object of the invention is to provide a mount device for elongated objects allowing a stable positioning on the mount device of objects having different length one from another.

These and other objects are solved at least partly by means of a mount device according to the attached independent claim.

Further advantageous aspects of the invention are set forth in the dependent claims.

In a first aspect of the invention it is provided a mount device for supporting objects comprising a support device and at least one holding element coupled to the support device and configured for holding the object, the support device comprising at least one support element, an adjusting element and an actuating device coupled to the adjusting element and to the support element and arranged for being actuated for moving the adjusting element along a translation direction in relation to the support element and to the actuating device.

Preferably, the adjusting element and the at least one support element are provided with pushing element arranged for moving the adjusting device and/or the support element along a clamp direction transversal to the translation direction so that by translating the adjusting element along the translation direction the width of the support device along the clamp direction is adjusted.

In this way, by moving the adjusting element along a translation direction the width of the support device along a clamp direction transversal to the translation direction is varied.

In other terms, by translating the adjusting element along the translation direction the adjusting device and the support element are moved closer or farther one from another along the clamp direction. It shall be understood that two elements may be moved closer or farther to each other even if they are kept in contact to each other, because the distance between the respective centers of gravity may be taken into account.

In a version, the clamp direction is perpendicular to the translation direction.

The width of the support device along the clamp direction is adjusted so as to clamp/release the at least one holding element on/from the support device.

As the width of the support device is considered the distance between the two outer surfaces of the support device, measured along the clamp direction.

Each of the adjusting element and the support element comprises an internal surface arranged to face respectively the support element and the adjusting element and an opposite outer surface.

In this case, the width of the support device is the distance between the outer surface of the adjusting element and the outer surface of the support element.

The adjusting element and the at least one support element are placed side by side along the translation direction.

The adjusting element and the at least one support element are movable by means of the actuating device between at least one release configuration in which the support device has a first width and the holding element may be slid on the support device and at least one clamp configuration in which the adjusting element and the support element are spread apart and the support device has a second width in the clamp direction wherein the second width of the support device is greater than the first width and the at least one holding element is clamped on the support device.

The holding element is preferably provided with a cavity arranged to be coupled to the support device, the cavity is so shaped that the support device may be housed into the cavity. The cavity is so shaped that the first width of the support device in the release configuration is lower than the cavity width of the cavity of the holding element so that the latter may be slid on the support device, the support device being suitable for being so configured that the second width of the support device corresponds to the width of the cavity so that the holding element is clamped on the support device.

Advantageously, the adjusting element is provided with at least one protrusion extending from the adjusting element toward the support element and with at least one recess positioned in succession along the longitudinal axis of the support device with the at least one protrusion.

The at least one protrusion is preferably provided on the internal surface of the adjusting element.

The support element is preferably provided with at least one protruding element protruding from the support element towards the adjusting element and at least one indentation positioned in succession along the longitudinal axis of the support device with the at least one protruding element.

The protruding element is preferably provided on the internal surface of the support element.

The at least one protrusion and the at least one protruding element both act as the pushing elements in the support device of the invention.

The at least one protrusion and the at least one indentation are shapingly coupled, similarly the at least one protruding element and the at least one recess are shapingly coupled. In this way, in the release configuration the at least one protrusion is housed in the at least one indentation and the at least one protruding element is housed in at least one recess.

The profile of the adjusting element matches with the profile of the at least one support element so that they are shapingly coupled in the release configuration.

In the at least one clamp configuration the adjusting element and the at least one support element are uncoupled. The width of the support device in the at least one clamp configuration is greater than the width in the release configuration.

By translating the adjusting element along the translation direction from the release configuration, the protrusions translate in relation to the indentations along the longitudinal axis of the support device and progressively come out from the indentations, the protruding element progressively come out from the recesses thus increasing the width of the adjusting element.

The distance between the two outer surfaces of the adjusting element and the outer surface of the support element is increased thus increasing the width of the support device.

Advantageously the at least one protrusion is inclined in relation to the longitudinal axis of the support device by an angle comprised between 3° and 15°, preferably within 4° and 10°, more preferably of about 6.5°.

The at least one protruding element is preferably inclined in relation to the longitudinal axis by a further angle comprised between 3° and 15°, preferably within 4° and 10°, more preferably of about 6.5°.

Preferably, the angle and the further angle are preferably congruent one with another.

Preferably, the adjusting element comprises a plurality of protrusions positioned in succession one after the other along the longitudinal axis of the support device alternating with a plurality of recesses, the support element being provided with a plurality of protruding elements positioned in succession one after the other along the longitudinal axis alternating with a plurality of indentations.

The provision of a plurality of protrusion/recesses and a plurality of protruding elements/indentations along the longitudinal axis of the support device allows a regular spread of the support device to be obtained.

In a preferred advantageous version the support device comprises a first and a second support element so positioned that the adjusting element is interposed between the first support element and the second support element in the clamp direction.

In this case, the width of the support device is the distance between the outer surfaces of the two support elements, the internal surfaces of the two support elements facing the adjusting element.

The adjusting element preferably comprises a guide appendix extending from a lateral wall of the adjusting element and configured to be slidably housed in a sliding cavity defined in the support element.

During the movement of the adjusting element the guide appendix slides into the sliding cavity thus guiding the movement of the adjusting element.

Advantageously each protrusion comprises a push surface extending along the longitudinal axis from the adjusting element towards the guide appendix, a step portion arranged perpendicularly to the longitudinal axis and a corner bridging the push surface and the step portion. The corner forms preferably the portion of the protrusion closest to the first guide appendix.

The protrusion has preferably a rounded profile so as to avoid stops during the functioning of the support device.

The protrusion is so shaped that a gap is provided between the corner and the external surface of the first guide appendix.

In that way the movement of the adjusting element is more stable and safer.

Advantageously the actuating device comprises a knob coupled to the support element arranged to be actuated by the user and a threaded shaft extending from the knob and coupled with adjusting element so that by actuating the knob a translation of the adjusting element along the translation direction is obtained.

The knob is preferably rotatable in both direction of the rotation direction, so as to screw/unscrew the threaded shaft into/from a threaded hole of the adjusting element so as to move the adjusting element closer to/away from the knob.

In a version the actuating device comprises a shaft defining a threaded hole, the adjusting element being provided with a threaded shaft so that by rotating the knob the threaded shaft is screwed/unscrewed into/from the threaded hole so as to move the adjusting element closer to/away from the knob.

The support device is further provided with coupling means arranged for rotatably coupling the support element to the knob, the coupling means being so configured to allow the rotation of the knob in relation to the support element and to avoid the translation of the knob in relation to the support element.

This allows safer actuation of the actuating device.

BRIEF DESCRIPTION OF THE DRAWINGS

In order that the invention may be readily understood, embodiments thereof will now be described, by way of example with reference to the accompanying drawings, in which.

DETAILED DESCRIPTION OF THE PREFERRED EMBODIMENTS

Figure 1:
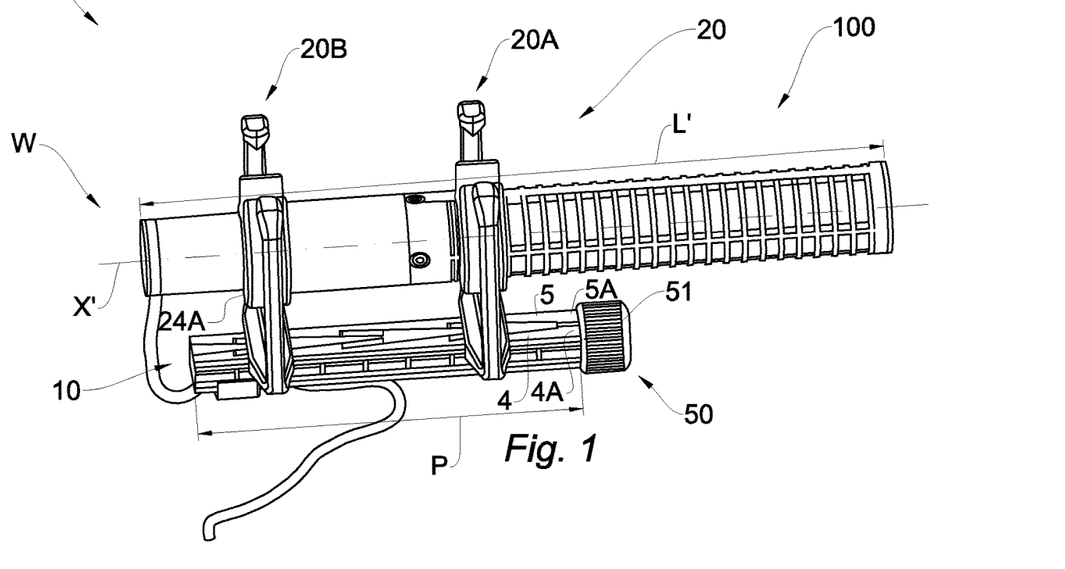
FIG. 1 is a perspective view of an embodiment of a mount of the invention holding an object.

With reference to the attached Figures it is shown a mount device 1 arranged for supporting objects, like for example the microphone 100 shown in FIG. 1.

Even if in the following explicit reference will be made to a microphone, the mount device 1 of the invention is particularly suitable for holding many different objects, in particular elongated objects.

The mount device 1 of the invention is particularly suitable for holding delicate elongated objects.

It is intended with the definition "elongated object" a tridimensional object having the dimension along one axis, conventionally the longitudinal axis, greater than the dimensions along the other two axis. Usually it is indicated that the greatest dimension corresponds to the length of the object.

The microphone 100 has an elongated body having a length L' considered along the longitudinal axis X' of the microphone 100.

Figure 2:
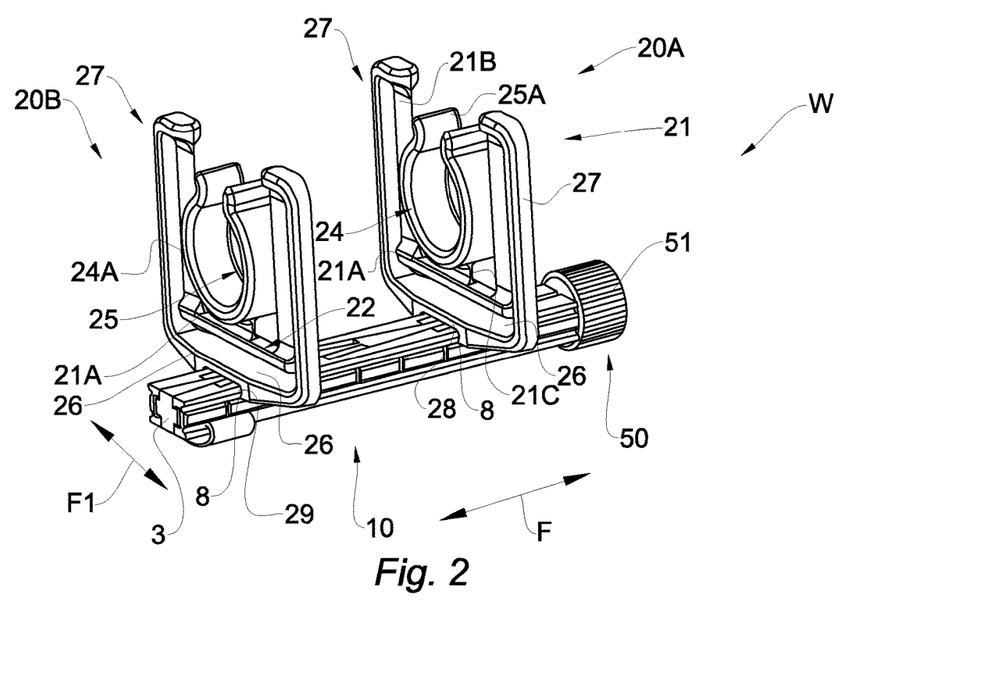
FIG. 2 is a perspective view of the mount of the invention in a clamp configuration.
Figure 3:
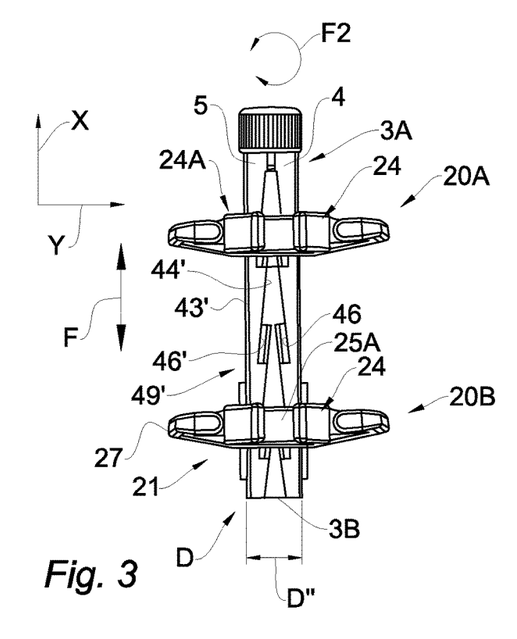
FIG. 3 is a view from above of the mount of FIG. 2.

The mount device 1 comprises a support device 10, better visible in FIGS. 3-11, and a plurality of holding elements 20 arranged to be connected to the support device 10, as visible for example in FIGS. 1-3.

In the version shown, the plurality of holding elements 20 comprises a first 20A and a second holding element 20B, nevertheless in other version of the mount device not shown in the Figures, a different number of holding elements may be provided in the mount device of the invention.

The number of the holding elements of the mount device are chosen in dependence of the longitudinal dimension of the object to be mounted in the mount device 1.

In the version shown, the first 20A and the second holding element 20B are identical and therefore only one of them will be described in detail in the following, and the same parts will be indicated with the same reference numbers.

The first holding element 20A comprises a base portion 22 arranged to be coupled to the support device 10, a holding portion 24 defining a mounting housing 25 in which the microphone 100 may be housed and a frame 21 connecting the base portion 22 and the holding portion 24.

The base portion 22 comprises a base 26 provided with connecting means 23 for connecting the holding element 20A to the support device 10 and two arms 27 extending from the base 26 in a direction opposite to the connecting means 23, and thus opposite to the support device 10. The arms 27 are so shaped that the base portion 22 has a "U" shaped form. The arms 27 are preferably made of resilient material.

The connecting means 23 are so configured to allow the holding element 20A to be slid on the support device 10 along the longitudinal axis X of the support device 10, as explained in the followings.

In the version shown the connecting means 23 comprises a cavity 28 formed in the base 26 and arranged to be coupled to the support device 10 as better explained in the following.

The cavity 28 has a cavity width Dc and has a "C" shape provided with two lateral cavity walls 29 ending with respective edge 8 configured to allow the holding element 20A to be slid along the support device 10 along the longitudinal axis X, as explained in the followings.

The frame 21 comprises a frame base 21A and two frame arms 21B provided at opposite ends of the frame base 21A and extending therefrom. Each frame arm 21B is connected at its opposite ends respectively to one end of the frame base 21A and to a free end of an arm 27 so as to be interposed between the arm 27 and the frame base 21A. The frame arm 21B is preferably made of resilient material and it is almost parallel to the base 22.

The frame base 21A is distanced from the base 22 and is so positioned that a gap is identified between the frame base 21A and the base 26.

Therefore, the holding portion 24 is distanced from the base 22. This allows the vibrations and sudden movements to be absorbed.

The holding portion 24 is attached to the frame base 21A by bridge elements 21C made of resilient material.

Therefore, the holding portion 24 is distanced from the base 22 and it is connected to the base 22 by means of the bridge elements 21C.

This allows the vibrations and sudden movements to be absorbed. This effect is also increased by the absence of direct contact between the base 22 and the holding portion 24.

This allows the vibrations acting on the microphone 100, or on the object mounted into the holding elements 20A, 20B, to be limited. The microphone 100 is thus stably mounted in the holding elements 20A, 20B.

The holding portion 24 is delimited by a deformable wall 24A so shaped to define a mounting housing 25 for the microphone 100 provided with an opening 25A through which the microphone 100 can be inserted into the housing 25. The mounting housing 25 may have an almost semicircular shape with the opening 25A arranged towards the opposite direction in relation to the frame base 21A and thus of the support device 10, so that the housing 25 can be easier accessed by a user.

In other version of the mount device not shown in the Figures, the mount device can be provided with holding elements different one from another, for example holding elements having dimension different one from another and/or having mounting housing having different dimensions one from another and thus suitable for holding objects of different dimensions and/or objects having different dimensions along their longitudinal axis.

Figure 4:
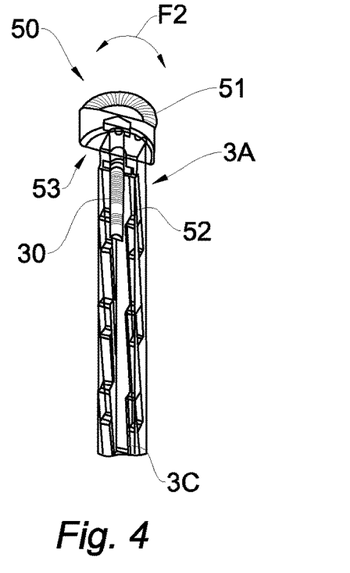
FIG. 4 is a sectional view of the support device of FIG. 3.
Figure 5:
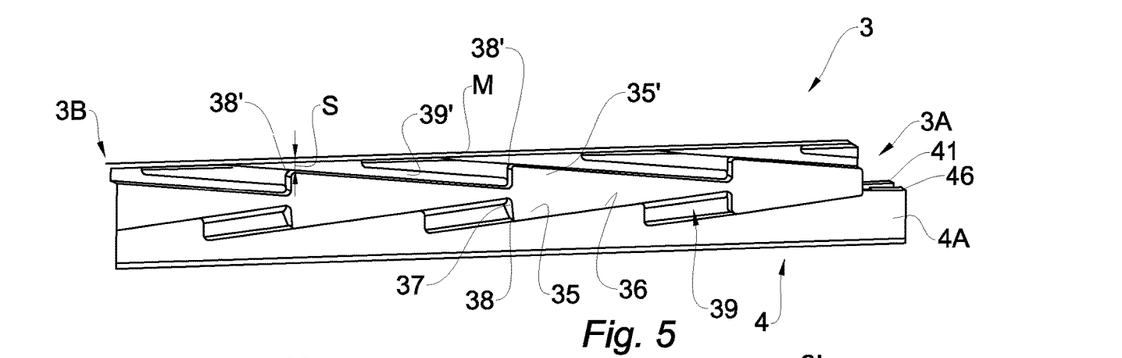
FIG. 5 is a schematic view of the support device of FIG. 3 in which some parts have been removed for clarity sake.

The support device 10, better visible in FIGS. 3-5, comprises an adjusting element 3, a first support element 4 and a second support element 5 placed side by side along the longitudinal axis X of the support device 10. The adjusting element 3 is interposed between the first support element 4 and the second support element 5 in a transversal axis Y of the support device 10, perpendicular to the longitudinal axis X.

The first and second support elements 4, 5 have an internal surface facing the adjusting element 3 and an opposed outer surface 4', 5' forming the outer surface of the support device 10.

The width D of the support device is the distances between the two outer surfaces 4', 5' of the first and second support elements 4, 5 respectively.

The outer surfaces 4', 5' are arranged for coupling with the connecting means 23 for connecting the least one holding element 20 to the support device 10.

The length P of the support device 10 is measured along the longitudinal axis X, whilst the width is measured along transversal axis Y.

The adjusting element 3 is movable in relation to the first support element 4 and to the second support element 5 in both directions along a translation direction, indicated by the arrow F in the Figures. In the version shown the translation direction F is parallel to the longitudinal axis X of the support device 10.

The adjusting element 3 is movable in relation to the first support element 4 and to the second support element 5 along the translation direction F so as to cause a translation of the first support element 4 and of the second support element 5 along a clamp direction F1, that, in the version shown, is parallel to the transverse axis Y, perpendicular to the longitudinal axis X so as to adjust the width D of the support device 10, as better explained in the following.

Figure 10:
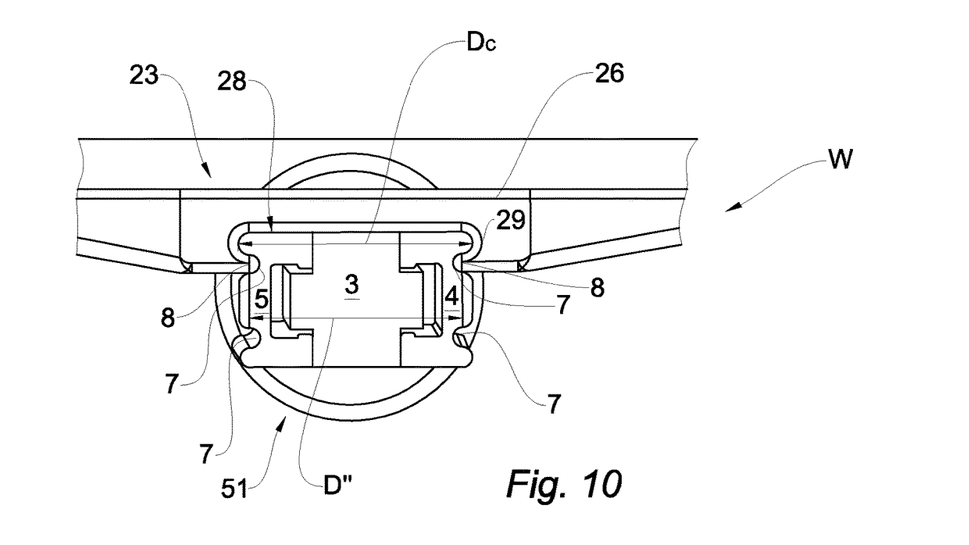
FIG. 10 is a front view the support device of FIG. 3.
Figure 11:
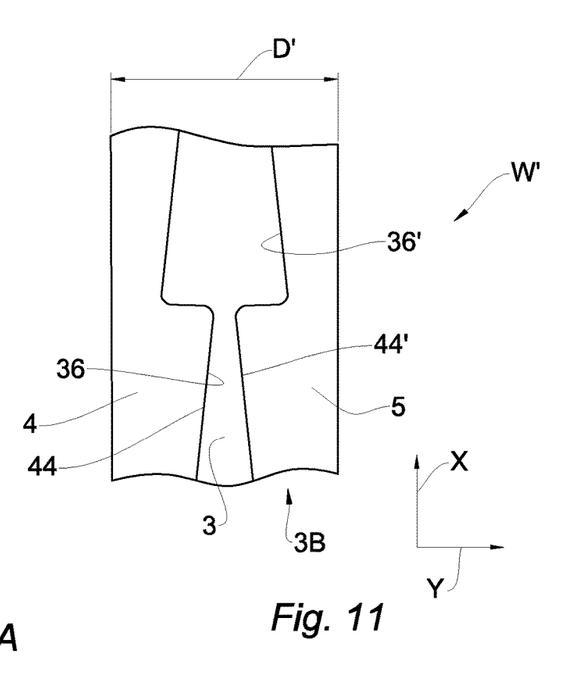
FIG. 11 is a schematic and interrupted from above of the support device of the invention in a release configuration.
Figure 11A:
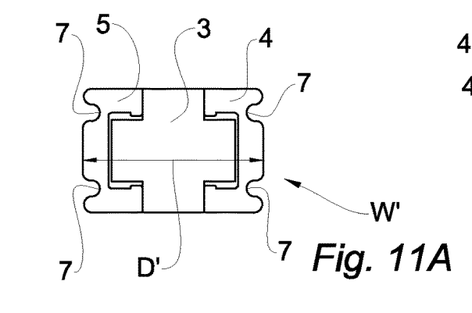
FIG. 11A is a front view of the support device of FIG. 11.

The adjusting element 3 is movable in relation to the first support element 4 and the second support element 5 between at least one release configuration W', schematically shown in FIGS. 11 and 11A, in which the adjusting element 3 and the first and second support elements are placed side by side and support device has a first width D' and at least one clamp configuration W, shown in FIGS. 1-10, in which the adjusting element 3 is spaced apart from the first 4 and second support element 5 in the clamp direction F1 and the support device 10 has a second width D" greater than the first width D', as better visible in FIG. 10.

In other words the distance D" between the outer surfaces 4', 5' of the first and second support elements 4, 5 in the clamp configuration W is higher than the distance D' between the outer surfaces 4', 5' of the first and second support elements 4, 5 in the release configuration W'.

According to the invention it is sufficient that in the clamp configuration W the adjusting element 3 is spaced apart from at least one of the first 4 or second support element 5 in the clamp direction F1.

In the release configuration W' the holding elements 20A, 20B are free to slide along the support device 10, in the at least one clamp configuration W, the holding elements 20A, 20B are clamped on to the support device 10. The first width D' of the support device 10 is lower than the cavity width Dc of the cavity 28 of the holding elements 20A, 20B so that the latter may be slid on the support device 10.

The first 4 and the second support elements 5 are provided with a longitudinal groove 7 defined respectively on the base wall 42 and on the further base wall 42' on the side opposite to the adjusting element 3 and arranged for slidably housing the edge 8 of the cavity 28.

In this way, the edge 8 of the cavity 28 slides into the groove 7. Therefore the movement of the holding element 20A, 20B in the support device 10 is guided.

The coupling between the edge 8 and the groove 7 also allows a stable coupling between the holding elements 20A, 20B and the support device 10 in the at least one clamp configuration W to be established.

The adjusting element 3 comprises a body 3C extending between a first longitudinal end 3A and an opposite second longitudinal end 3B and defined by two opposite lateral walls 11, 12, an upper wall 13 and a lower wall 14 extending along the longitudinal direction X between the first longitudinal end 3A and the opposite second longitudinal end 3B.

The adjusting element 3 is provided at the first longitudinal end 3A with a threaded hole 30, visible in FIG. 4, and arranged for cooperating with the actuating device 50 for moving the adjusting element 3 along the translation direction F, as explained in the following.

The body 3C is further provided with a first guide appendix 15 extending from the first lateral wall 11, and configured to be slidably housed in a first sliding cavity 46 defined in the first support element 4 and with a second guide appendix 16 extending from the second lateral wall 12, and configured to be slidably housed in a second sliding cavity 46' defined in the second support element 5.

Each guide appendix 15, 16 and the corresponding sliding cavity 46, 46' are so shaped that the guide appendix 15, 16 is slidable in the corresponding sliding cavity 46, 46'.

By moving the adjusting element 3 along the translation direction F, the guide appendices 15, 16 slide in the corresponding sliding cavity 46, 46', guiding the movement of the adjusting element 3.

The adjusting device 3 is provided with a plurality of protrusions 35 provided along the longitudinal axis of the adjusting device and alternating with plurality of recesses 39 so that the adjusting device 3 has a sawtooth profile. The protrusions 35 extend from the first lateral wall 11 in a transversal direction Y towards the first support element 4. The protrusions 35 are so shaped to define a plurality of recesses 39 into the adjusting element 3.

Each protrusion 35 comprises a push surface 36 extending along the longitudinal axis X from the adjusting element 3 towards the first guide appendix 15. The push surface 36 is inclined in relation to the longitudinal axis X by an angle $\alpha$ comprised between 3° and 15°, preferably within 4° and 10°, more preferably an angle of about 6.5°.

The push surface 36 has a length "L" comprised between 3 and 50 mm.

The length L and the angle of inclination $\alpha$ of the push surface 36 may be chosen during manufacturing.

Each protrusion 35 further comprises a step portion 37 arranged perpendicularly to the longitudinal axis X and a corner 38 bridging the push surface 36 and the step portion 37, the corner 38 forms the portion of the protrusion 35 closest to the first guide appendix 15.

Each protrusion 35 has preferably a rounded profile so as to avoid stops during the functioning of the support device 10.

Each protrusion 35 is so dimensioned that a gap "S" is provided between the corner 38 and the external surface M of the first guide appendix 15. The external surface M of the first guide appendix 15 is the surface facing in use the first sliding cavity 45.

This implies that considering the projection of the protrusion 35 on the same XY plane of the first guide appendix 15, a gap "S" along the Y direction is provided between the corner 38 and the external surface M of the first guide appendix 15.

The provision of the gap "S" allows a secure movement of the adjusting element 3 into the first sliding cavity 46.

Figure 6:
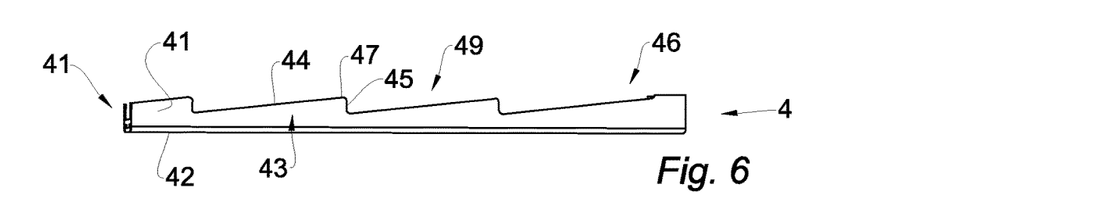
FIG. 6 is a lateral view of a support element of the support device of FIG. 3.
Figure 7:
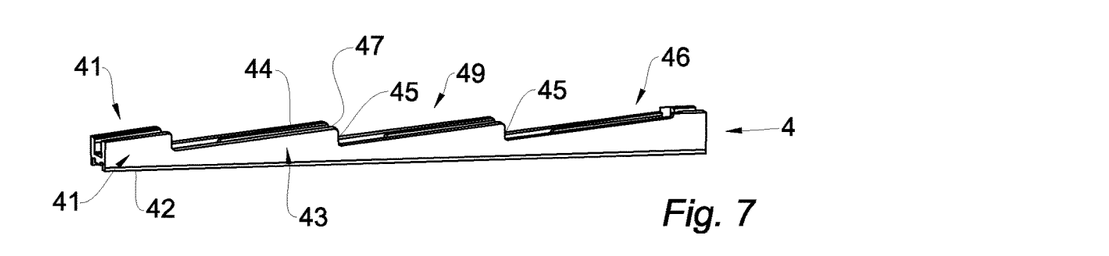
FIG. 7 is a perspective view of the support element of FIG. 6.
Figure 8:
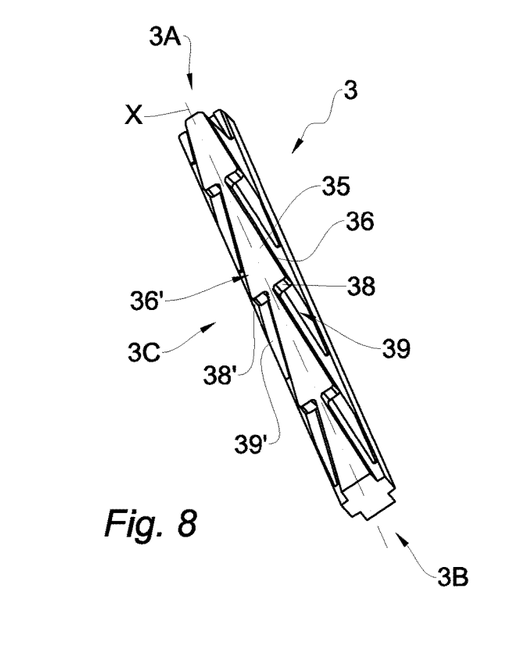
FIGS. 8 and 9 are perspective view of an adjusting element of the support device of FIG. 3.
Figure 9:
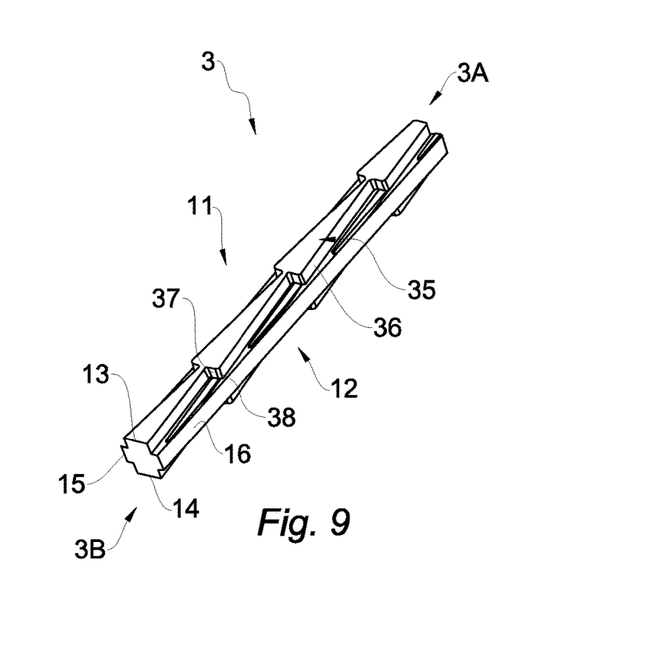

The first support element 4, better visible in FIGS. 5-7, comprises a body 40 defined by a base wall 42 and two lateral walls 41 extending from the base wall 42 so positioned to define into the body 40 a longitudinal cavity 46 extending along the longitudinal axis X of the first support element 4. In use, the first support element 4 is so positioned that the longitudinal cavity 46 is open towards the adjusting element 3.

Each lateral wall 41 is provided with a plurality of protruding elements 43 extending from the first support element 4 in a transversal direction Y towards the adjusting element 3 and a plurality of indentations 49 alternating with the protruding elements 43.

The protruding elements 43 alternate with the indentations 49 so as to define a sawtooth profile in the support element 4.

The plurality of protruding elements 43 are so shaped that a plurality of indentations 49 is defined in the support element 4.

Each protruding element 43 comprises an inclined surface 44 extending from the first support element 4 along the longitudinal axis X and inclined in relation to the longitudinal axis X by an angle $\beta$ comprised between 3° and 15°, preferably within 4° and 10°, more preferably an angle of about 6.5°.

The inclined surface 44 projects from the first support element 4 towards the adjusting element 3.

The angle $\beta$ of inclination of the inclined surface 44 corresponds to the angle of inclination $\alpha$ of the push surface 36.

The inclined surface 44 have length "L1" comprised between 3 and 50 mm which corresponds to the length of the push surface 36.

The length L1 and the angle $\beta$ of the inclined surface 44 may be chosen during the manufacturing.

Each protruding element 43 further comprises a step 45 and a corner portion 47 bridging the inclined surface 44 and the step 45.

According to the invention, the protrusions and the indentations are shapingly coupled, similarly the protruding elements and the indentations are shapingly coupled, so that in the release configuration W' the protrusions are housed in the indentations and the protruding elements are housed in the indentations.

In the release configuration W' the first lateral wall 11 and the first support element 4 are shapingly coupled.

The number of the protrusions 35, the length "L" of the push surface 36, the angle $\alpha$ of the push surface 36, the number of the protruding elements 43, the length "L1" and/or the angle $\beta$ of the inclined surface 44, is correspondingly chosen, as explained in the following.

In particular, the push surface 36 and the inclined surface 44 are parallel one to another and the angle $\beta$ of the inclined surface 44 and the angle $\alpha$ of the push surface 36 are congruent one with another.

The second lateral wall 12 of the adjusting element 3 is provided with a further plurality of protrusions 35' positioned along the longitudinal axis of the adjusting element 3 and extending from the adjusting element 3 in a transversal direction Y and with a further plurality of recesses 39' alternating with the further protrusion 35' and arranged for interacting with the second support element 5 in the movement of the adjusting element 3, as explained below, for adjusting the position of the adjusting element 3 and the second support element 5.

The further protrusions 35' have the same features of the protrusions 35 and, therefore, the further protrusion 35' will not be explained in detail and the features corresponding to the features of the protrusions 35 will be indicated with the same reference numbers with an inverted commas.

As indicated above, the second support element 5 corresponds to the first support element 4 and it will not be described in detail, the parts corresponding to the parts of the first support element 4 will be indicated with the same reference number followed by an inverted comma.

The further longitudinal cavity 46' of the second support element 5 is arranged for slidably housing the second guide appendix 16 of the adjusting element 3.

The second support element 5 has profile matching with the profile of the second lateral wall 12, so that in the release configuration W' the further protrusions 35' are housed in the further indentations 49' and the further protruding elements 43' are housed in the further indentations 39'.

According to the invention the profile second support element 5 matches with the profile of the second lateral surface 12, therefore the number and/or the features of the further protrusions 35' must be choses correspondingly to the number and features of the further protruding elements 43' and vice-versa.

In a version not shown, only one of the first or second lateral wall of the adjusting element is provided with a plurality of protrusions spaced the along the longitudinal axis X of the adjusting element and protruding therefrom. In this case, only one of the support element is provided with one or more protruding elements and one or more indentations so that the profile of the first or second lateral wall matches with the profile of the corresponding support element.

In a further version not shown the support device is provided with only one support element and an adjusting element movable along the translation direction in relation to the support element for tightening/releasing the holding elements on/from the support device.

In further versions not shown in the Figures, the adjusting device and correspondingly the support element is provided with a single protrusion extending towards the first guide appendix.

Additionally, in a further version not shown each protrusion may have a push surface with an inclination in relation to the longitudinal axis one different from another.

In further versions, the protrusion and the further protrusion may have a different inclination one from another and/or the push surface and the further push surface may have different length one from another.

The support device 10 further comprises an actuating device 50 coupled to the support device 10 and arranged for being actuated by a user for moving the adjusting element 3 in relation to the first and the second support element 4, 5 along the translation direction F so as to tighten/release the first and the second holding elements 20A, 20B on/from the support device 10, as explained below.

The actuating device 50 comprises a knob 51 arranged to be actuated by the user and a threaded shaft 52 extending from the knob 51 and rotatably housed in the threaded hole 30 of the adjusting element 3.

In a further version not shown the actuating device comprises a shaft defining a threaded hole and the adjusting element comprises a threaded shaft rotatable in the threaded hole by means of the rotation of the knob.

The knob 51 is rotatable in both direction of the rotation arrow F2 as indicated in the Figures.

By rotating the knob 51 in a first direction, the threaded shaft 52 is screwed into the threaded hole 30 and thus moved towards the adjusting element 3, by rotating the knob 51 in a second direction opposite to the first direction, the threaded shaft 52 is unscrewed from the threaded hole 30 thus the knob 51 is moved away from the adjusting element 3.

The knob 51 is coupled to the first support element 4 and to the second support element 5 so that the knob 51 may rotate in relation to the first support element 4 and to the second support element 5 and the translation of the knob 51 along the translation direction F in relation to the to the first support element 4 and to the second support element 5 is impeded.

The knob 51 is internally hollow and define a rotation cavity 53 in which a first end portion 4A of the first support element 4 and a second end portion 5A of the second support element 5 are rotatably housed.

The support device 10 is further provided with coupling means not visible in the Figures and arranged for rotatably coupling the first end portion 4A and the second end portion 5A to the knob 52. The coupling means is so configured that the knob 52 is rotatable in relation to the first end portion 4A of the first support element 4 and a second end portion 5A and the translation along the translation direction F of the knob 51 in relation to the first 4 and second support element 5 is impeded.

The provision of coupling means for coupling the first 4 and second support elements 5 to the knob 51 allows any disengagement of the first 4 and second support elements 5 to be avoided.

In a version the coupling means comprises at least a circumferential slit defined in the rotation cavity 53, and at least one projection defined in the first end portion 4A and in the second end portion 5A so configured to be rotatably housed in the slit.

As indicated above, by actuating the actuating device 50, the support device 10 is moved between the at least one release configuration W' and the at least one clamp configuration W and the width D of the support device 10 is adjusted, as explained herein below.

In the release configuration W' the adjusting element 3 is placed side by side with the first and second support element 4, 5, the first lateral wall 11 is coupled with the first support element 4, the second lateral wall 12 is coupled with the second support element 5.

In the release configuration W' the protrusions 35 are housed in the indentations 49 and vice versa the protruding elements 43 are positioned in the recesses 39. Similarly, the further protrusions 35' are positioned in the further indentations 49' and vice versa the further protruding elements 43' are positioned in the further recesses 39'.

Advantageously, in the release configuration W' the step portions 37 abut against the corresponding steps 45, and the further step portions 37 abut against the corresponding further steps 45'.

In the release configuration W' the support device 10 has a first width D' lower than the cavity width Dc and the holding elements 20A, 20B may slide on the support device 10.

In the release configuration W' it is also possible to remove the holding elements 20A, 20B from the support device 10 and/or to couple a desired number of holding elements to the support device 10, and/or to adjust the position of the holding elements 20A, 20B on the support device 10.

In the version shown, in the release configuration W' the adjusting element 3 is farther from the knob 51.

By actuating the knob 51 so as to screw the threaded shaft 52 in the threaded hole 30 so as to move the knob 51 towards the adjusting element 3, the adjusting element 3 is translated along the translation direction F towards the knob 51 in relation to the first 4 and second support element 5.

The first guide appendix 15 slides into the first sliding cavity 46 and respectively the second guide appendix 16 slides in the second sliding cavity 46.

By translating the adjusting element 3 along the translation direction F, the first lateral wall 11 translates in relation to the first support element and they are progressively uncoupled. The protrusions 35 translate in relation to the protruding elements 43 and push surfaces 36 slide over the inclined surfaces 44 and the width D of the support device 10 is progressively increased. By translating the adjusting element 3, the step portion 37 is progressively spaced from the step 45.

In the clamp configuration W the protrusions 35 are positioned at least partly outside the indentations 49, the further protrusion 35' are positioned at least partly outside the further indentation 49', the protruding element 43 are positioned at least partly outside the recesses 39 and the further protruding element 43' are positioned at least partly outside the further recesses 39'.

As the push surfaces 36 are inclined in relation to the longitudinal axis X, by moving the adjusting element 3, the push surfaces 36 push the adjusting element 3 away from the first support element 4. Similarly the inclined surfaces 44, progressively push the first support element 4 away from the adjusting element 3. Similarly by translating the adjusting element 3, the further push surfaces 36' push the adjusting element 3 away from the second support element 5 and the further inclined surfaces 44', progressively push the second support element 5 away from the adjusting element 3.

As the adjusting element 3 is fixed to the knob 51, the first 4 and second support element 5 are moved along the clamp direction F1 away from the adjusting element 3.

By translating the adjusting element 3 from the release configuration W' in the translation direction F, the first 4 and second 5 support element are translated in relation to the adjusting element 3 in the clamp direction F1 thus progressively increasing the width D of the support device 10.

Therefore, it is increased the force exerted by the supporting device 10, and in particular by the first 4 and second support element 5 on the cavity walls 29 of the cavity 28. Therefore, the holding elements 20A, 20B are progressively clamped on the support device 10 and the sliding of the holding elements 20A, 20B on the support device 10 is progressively impeded.

The edges 8 of the cavity 28 are progressively clamped in the grooves 7.

In the clamp configuration W the support device 10 has a second width D" corresponding to the cavity width Dc of the cavity 28 and the holding elements 20A, 20B are clamped on the support device 10.

Rotating the knob 51 so as to unscrew the threaded shaft 52 from the threaded hole 30, the support device 10 is moved towards the release configuration W': the adjusting element 3 is translated along the translation direction F so as to progressively couple the first 11 and second lateral wall 12 respectively with the first 4 and second support element 5 reducing the width D of the support device 10.

The width D of the support device 10 is progressively reduced, the force exerted on the lateral cavity walls 29 is progressively reduced, the holding elements 20A, 20B are progressively released from the support device 10 and can be slid over the support device 10.

It is therefore possible to adjust the longitudinal position of the holding elements 20A, 20B on the support device 10.

It is also possible to remove the holding elements 20A, 20B from the support device 10, for example substituting the holding elements providing a holding elements having a holding cavity 25 of a different dimension and thus suitable for holding an elongated object 100 having different dimensions.

The angle α of the push surface 36, and the angle β of the inclined surface 44 is higher than angle of friction of the material used for the adjusting element 3 and the support elements 4, 5 so that any block of the adjusting element and support element is avoided.

This also assures that the adjusting element 3 may reversibly be moved along the translation direction F towards to and farther from the knob 51.

As the protrusions 35 and the protruding elements 43 are provided with inclined surfaces the width of the support device 10 is progressively adjusted by moving the adjusting element 3 and consequently the force exerted on the lateral cavity walls 29 is progressively adjusted and the holding element progressively tightened.

As the width D of the support device 10 is adjustable, it is possible to clamp on the support device 10 holding elements having a cavity 28 of different width Dc by adjusting the position of the adjusting element 3 in relation to the first and second support element.

Adjusting the inclination of the push surfaces 36, 36' of the inclined surfaces 44, 44' it is possible to adjust the length of the stroke along the translation direction F necessary for obtaining a desired variation of the width D of the support device 10 for clamping the holding elements 20A, 20B thereon and/or the force required to tighten/release the holding elements 20A, 20B.

It is possible to adjust the extent of rotation of the knob 51 for obtaining a desired stroke and thus a desired variation of the width D of the support device 10.

It is further possible to adjust the precision required for tightening/releasing the holding elements 20A, 20B on the support device 10.

The provision of the inclined protrusion and protruding elements allows a smooth actuation of the support device 10.

The invention thus solves the objects indicated and allows many advantages to be obtained.

The invention claimed is:

1. A mount device (1) for supporting objects (100), the mount device (1) comprising: a support device (10) and at least one holding element (20, 20A, 20B) coupled to the support device (10) and configured for holding said object (100), the support device (10) comprising at least one support element (4, 5), an adjusting element (3) placed side by side to the at least one support element (4, 5) and an actuating device (50) coupled to the adjusting element (3) and arranged for being actuated for moving the adjusting element (3) along a translation direction (F) in relation to the at least one support element (4,5), the adjusting element (3) and the support element (4, 5) being provided with a pushing element arranged for moving the adjusting element (3) and/or the at least one support element (4, 5) along a clamp direction (F1) transversal to the translation direction (F), the pushing element being so configured that by translating the adjusting element (3) along the translation direction (F) a width (D) of the support device (10) along the clamp direction (F1) is adjusted so as to clamp/release the at least one holding element (20) to/from said support device (10), wherein the at least one holding element (20) comprises a connector (23) for connecting the least one holding element (20, 20A, 20B) to the support device (10), the connector defining a cavity (28) having a cavity width (Dc) arranged to be coupled to the support device (10), and the actuating device (50) being suitable for moving the adjusting element (3) between a release configuration (W') in which the support device (10) has a first width (D') less than the cavity width (Dc) and the at least one holding element (20, 20A, 20B) is adapted to be slid on the support device (10) and a clamp configuration (W) in which the adjusting element (3) and the at least one support element (4, 5) are spread apart and the second width (D") of the support device (10) is greater than the first width (D') in the release configuration (W') and the at least one holding element (20, 20A, 20B) is clamped on the support device (10).

2. The mount device (1) according to claim 1, wherein the adjusting element (3) is provided with at least one protrusion (35, 35') extending from the adjusting element (3) toward the at least one support element (4, 5) and the at least one support element (4, 5) is provided with at least one protruding element (43, 43') protruding from the at least one support element (4, 5) towards the adjusting element (3), the at least one protrusion (35, 35') and at least one protruding element (43, 43') forming the pushing elements of the support device (10), the at least one protrusion (35, 35') being preferably inclined in relation to a longitudinal axis (X) of the support device (10) by an angle (α) comprised between 3° and 15°, and the at least one protruding element (43, 43') being inclined in relation to the longitudinal axis (X) by a further angle (B) comprised between 3° and 15°, that is congruent with the angle (α) of inclination of the at least one protrusion (35, 35').

3. The mount device (1) according to claim 2, wherein the adjusting element (3) comprises a plurality of protrusions (35, 35') positioned in succession one after the other along the longitudinal axis (X) alternating with a plurality of recesses (39), the at least one support element (4, 5) being provided with a plurality of protruding elements (43, 43') positioned in succession one after the other along the longitudinal axis (X) alternating with a plurality of indentations (49, 49').

4. The mount device (1) according to claim 1, wherein the adjusting element (3) comprises a guide appendix (15) extending from a lateral wall (11) of the adjusting element (3) and configured to be slidably housed in a sliding cavity (46, 46') defined in the at least one support element (4, 5).

5. The mount device (1) according to claim 4, wherein each protrusion (35, 35') extends towards the guide appendix (15,16) and it is so dimensioned that each protrusion is spaced from an external surface (M, M') of the guide appendix (15, 16) and that a gap(S) is provided between a corner (38, 38') of the at least one protrusion (35, 35') and the external surface (M, M') of the guide appendix (15, 16).

6. The mount device (1) according to any claim 1, further comprising a first support element (4) and a second support element (5) so positioned that the adjusting element (3) is interposed between the first support element (4) and the second support element (5) in the clamp direction (F1).

7. The mount device (1) according to claim 6, wherein the adjusting element (3) is provided with at least one protrusion (35) extending from a first lateral wall (11) of the adjusting element facing in use the first support element (4) and with at least one further protrusion (35') extending from a second lateral wall (12) of the adjusting element (3) facing in use the second support element (5).

8. The mount device (1) according claim 1, wherein the actuating device (50) comprises a knob (51) rotatable by a user for screwing/unscrewing a threaded shaft (52) into/from a threaded hole (30) so as to move the adjusting element (3) closer to/away from the knob (51), the threaded shaft (52)

and the threaded hole (30) being respectively defined on the actuating device (50) and on the adjusting element (3) or vice-versa.

9. The mount device (1) according to claim 8, wherein the support device (10) is further provided with coupling means arranged for rotatably coupling the support element (4, 5) to the knob (51), the coupling means being so configured to allow the rotation of the knob (51) in relation to the support element (4, 5) and to avoid the translation of the knob (51) in relation to the support element (4, 5).

10. The mount device (1) according to claim 1, wherein the holding element (20, 20A, 20B; 20', 20'A, 20'B) is provided with connector (23) that connects the holding element (20, 20A, 20B; 20', 20'A, 20'B) to the support device (10), the connector (23) comprising a cavity (28) in which the support device is adapted to be slidably housed, the cavity having a "C" shape delimited by lateral wall (29) ending with respective edge (8) configured to be inserted in a groove (7) provided on the support element (4, 5) and suitable for allowing the holding element (20, 20A, 20B; 20', 20'A, 20'B) to be slid along the support device (10) along the longitudinal axis (X).

\* \* \* \* \*